United States Patent
Woo

(10) Patent No.: US 11,321,444 B2
(45) Date of Patent: May 3, 2022

(54) AUTHENTICATION MANAGEMENT METHOD AND SYSTEM

(71) Applicant: eStorm Co., LTD., Seoul (KR)

(72) Inventor: Jong Hyun Woo, Seoul (KR)

(73) Assignee: eStorm Co., LTD., Seoul (KR)

( * ) Notice: Subject to any disclaimer, the term of this patent is extended or adjusted under 35 U.S.C. 154(b) by 149 days.

(21) Appl. No.: 16/485,780

(22) PCT Filed: Feb. 12, 2018

(86) PCT No.: PCT/KR2018/001813
§ 371 (c)(1),
(2) Date: Aug. 13, 2019

(87) PCT Pub. No.: WO2018/151480
PCT Pub. Date: Aug. 23, 2018

(65) Prior Publication Data
US 2020/0050751 A1    Feb. 13, 2020

(30) Foreign Application Priority Data

Feb. 20, 2017 (KR) .................. 10-2017-0022588
Feb. 20, 2017 (KR) .................. 10-2017-0022589

(51) Int. Cl.
*G06F 17/00* (2019.01)
*H04L 29/06* (2006.01)
(Continued)

(52) U.S. Cl.
CPC .............. *G06F 21/45* (2013.01); *G06F 21/34* (2013.01); *G06F 21/42* (2013.01)

(58) Field of Classification Search
CPC .......... G06F 21/45; G06F 21/34; G06F 21/42; G06F 21/31; G06F 21/41; G06F 21/46;
(Continued)

(56) References Cited

U.S. PATENT DOCUMENTS

2005/0091213 A1* 4/2005 Schutz ............... G06F 21/31
2008/0092216 A1* 4/2008 Kawano ............. H04L 9/0894
726/5

(Continued)

FOREIGN PATENT DOCUMENTS

KR   10-2009-0018440 A    2/2009
KR       10-1333006 B1   11/2013
KR   10-2015-0082909 A    7/2015

OTHER PUBLICATIONS

International Search Report for PCT/KR2018/001813 dated Jun. 7, 2018 from Korean Intellectual Property Office.

*Primary Examiner* — Amie C. Lin
(74) *Attorney, Agent, or Firm* — Revolution IP, PLLC

(57) ABSTRACT

Disclosed is an authentication management system including a custom credential provider installed on a computing device to support OS account authentication through an alternate authentication method that replaces an OS account authentication method supported by an operating system of the computing device, and an authentication management server communicably connected to the custom credential provider via a communication network to perform user authentication related to a user who attempts to OS account authentication using the alternate authentication information when the OS account authentication based on the alternate authentication information used in the alternate authentication method is attempted and transfer, to the custom credential provider, account authentication information necessary to perform OS account authentication according to the OS account authentication method supporting by the operating system or a seed value that is based on generation of the account authentication information when the user authentication is successful.

10 Claims, 4 Drawing Sheets

(51) Int. Cl.
*G06F 21/45* (2013.01)
*G06F 21/34* (2013.01)
*G06F 21/42* (2013.01)

(58) Field of Classification Search
CPC . G06F 21/72; H04L 63/0861; H04L 63/0846; H04L 63/083
See application file for complete search history.

(56) References Cited

U.S. PATENT DOCUMENTS

| | | | |
|---|---|---|---|
| 2008/0115208 A1 | 5/2008 | Lee | |
| 2015/0089239 A1* | 3/2015 | Yang | G06F 21/34 713/184 |
| 2016/0241548 A1* | 8/2016 | Kim | H04W 12/082 |

* cited by examiner

【Figure 1】
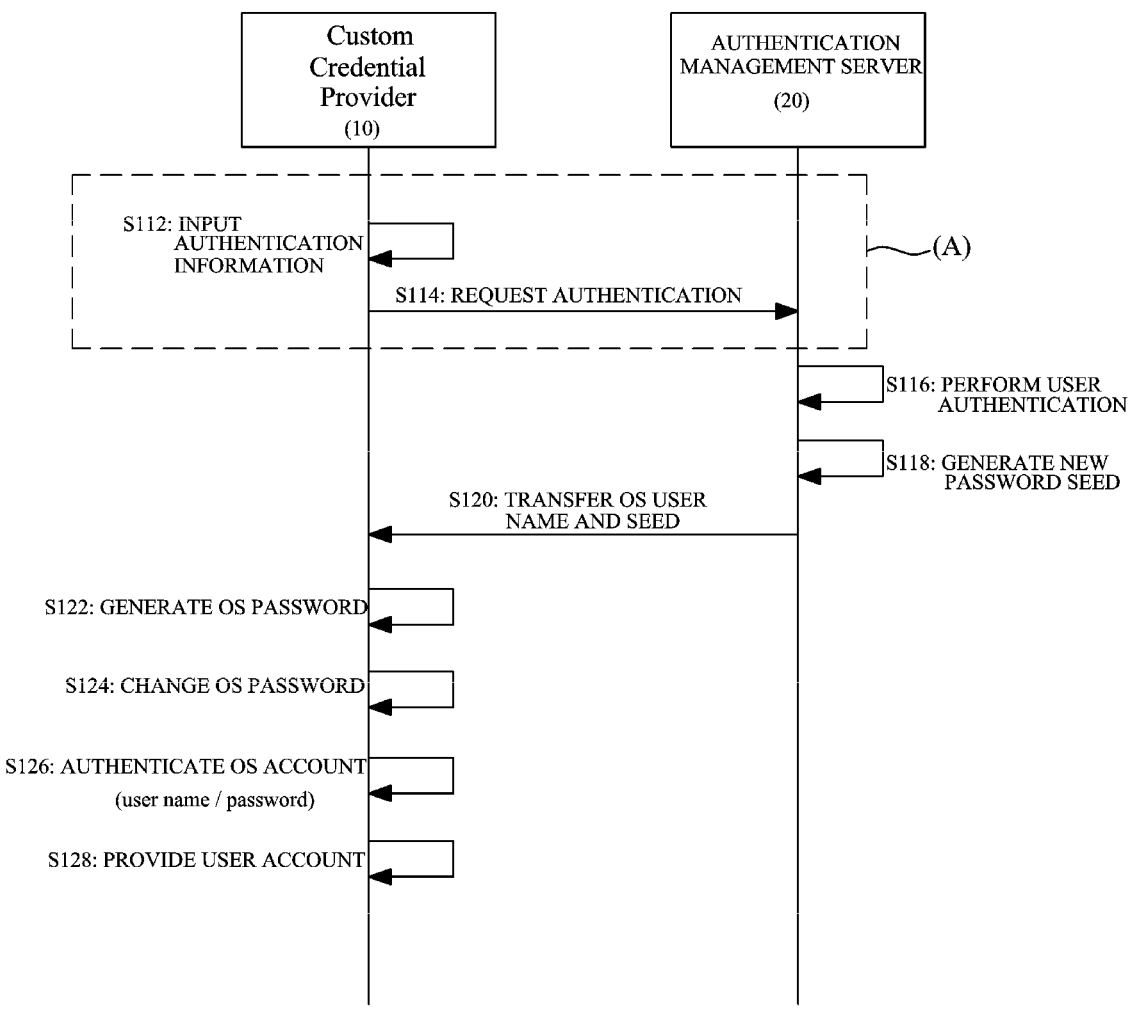

[Figure 2]
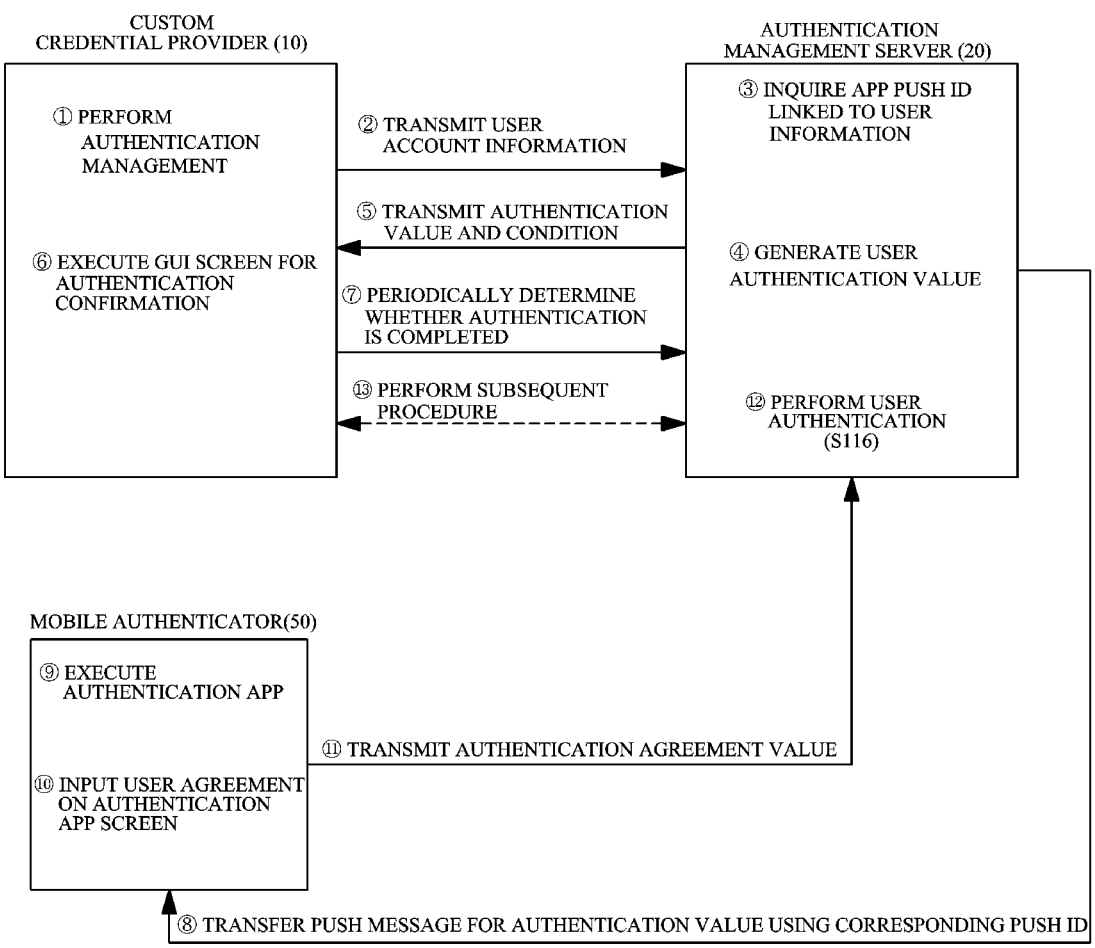

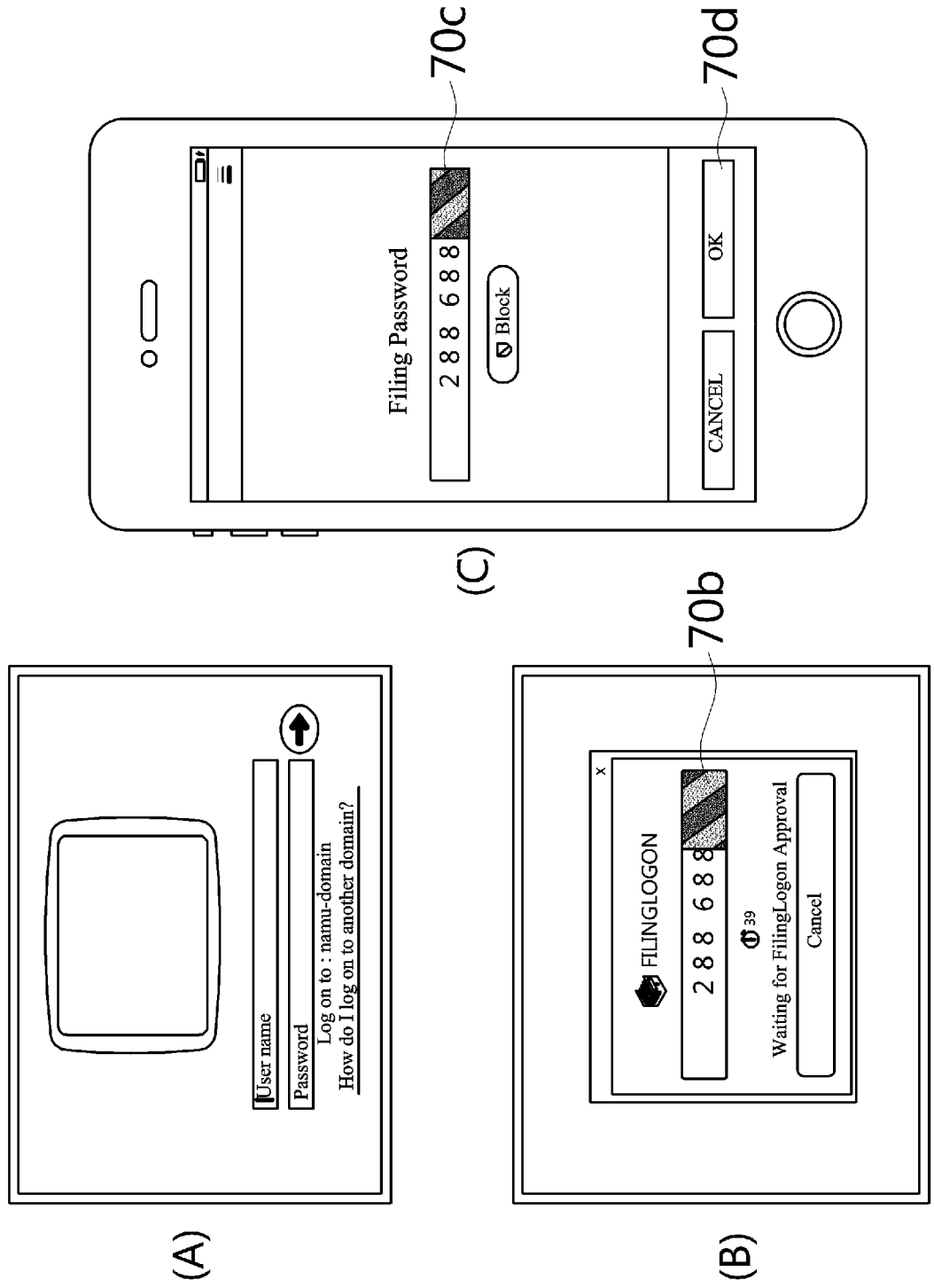
[Figure 3]

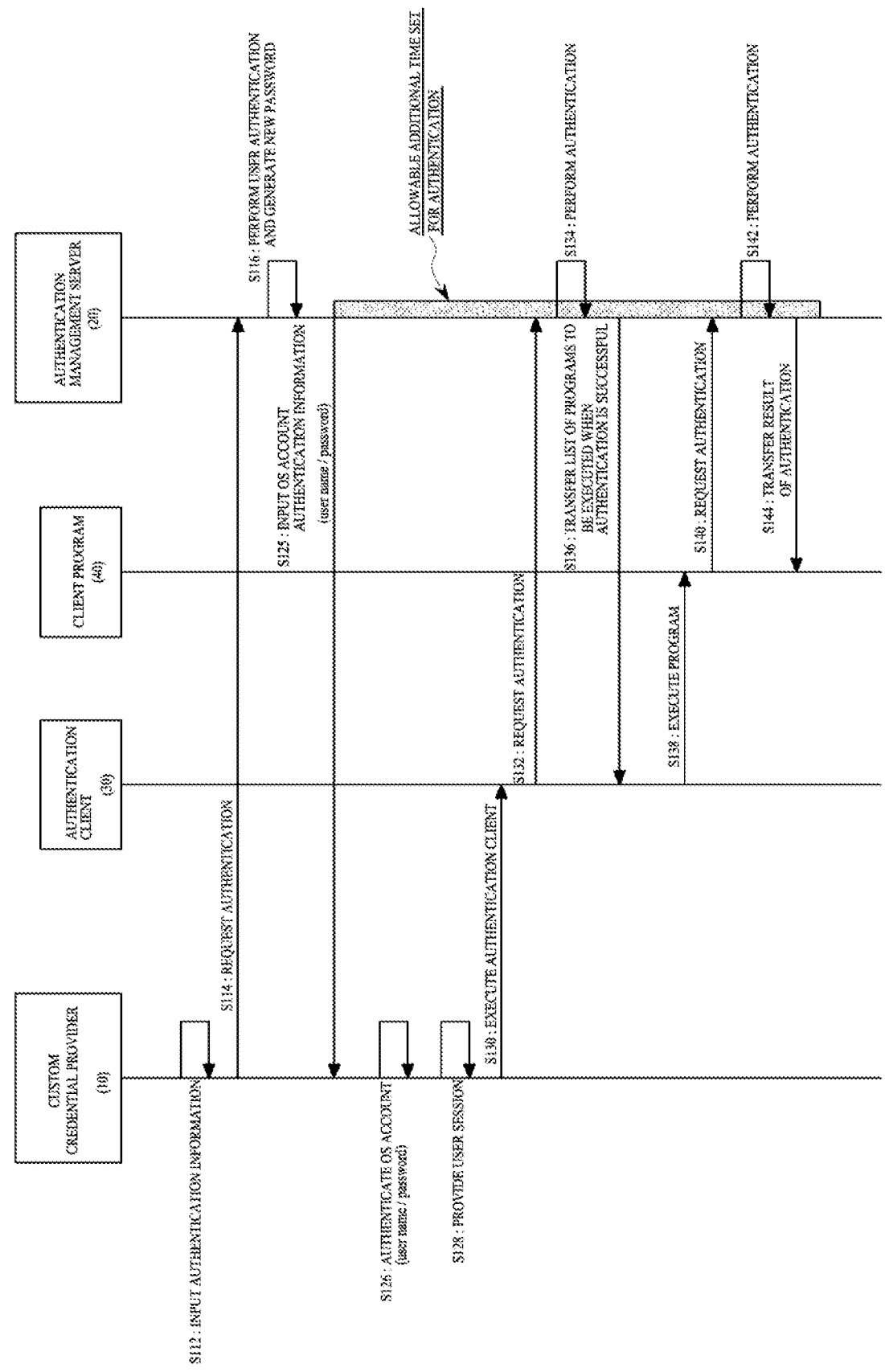
[Figure 4]

AUTHENTICATION MANAGEMENT METHOD AND SYSTEM

TECHNICAL FIELD

The present invention relates to an authentication management method and an authentication management system, and more particularly, to a method of automatically changing a password of an operating system so as to meet security regulations, or automatically executing and authenticating a program in a user session of the operating system and a system therefor.

BACKGROUND ART

Recently, in accordance with the revision of security-related laws, regulations are introduced to periodically change a password for a Windows account when logging in to a Microsoft Windows-based system. However, it is inconvenient to periodically change the password of the operating system (OS), and the security is rather weakened in many cases when the user changes (updates) the password to (with) a password that is easy to remember in order to solve such inconvenience.

Accordingly, a technology for authenticating a user in a different manner is gradually emerging without using a user authentication method using a user ID and a password. For example, in the case of Windows 10, a user's face may be recognized through a camera mounted on a PC and the user's login is automatically processed. In the case of an operating system installed with FIDO (Fast Identity Online), the user's login may be processed through fingerprint recognition, iris recognition, or speech recognition. However, even in the case of the above alternate authentication method, the authentication method is not different from the existing method in the operating system. That is, no matter how the user authenticates, the user's account and password still exist within the operating system. Only the user's authentication interface is replaced by various other authentication means. When authentication according to such other authentication means is completed, the user is authenticated with a user account and password actually registered in the operating system. In the case of Windows, the credential provider is extended by a third party to provide APIs to allow users to be authenticated with various authentication methods. However, the Windows is driven by the Windows user account and password and an account-specific session is provided.

As a result, as described above, even in the case of the alternate authentication means, it is still necessary to periodically update the password, and the inconvenience caused by the password update remains. Therefore, when authenticating a user using a third authentication method, a technology for automatically changing a password managed in an operating system is required before a specified password change cycle is reached according to a related regulation.

In addition, when the user authentication is completed as described above after the operating system runs, a session according to a corresponding user account is provided, and a number of conventional technologies for automatically starting a program in the provided user session exist, but there is no technology that automatically enters a user ID and a password for actual execution of the program.

In general, an office worker needs to perform at least three to four user authentications, such as operating system account authentication, company email authentication, groupware authentication, and work system authentication in order to start work after arriving. As a result, the user often experiences inconvenience due to work delay. Therefore, there is a need for a technology and a method for performing authentications in an integrated manner at once.

DISCLOSURE

Technical Problem

An aspect of the present invention provides a method and a system for automatically setting and changing (updating) a password of an operating system or the like so as to meet security regulations without requiring the user to enter and change (update) the password directly when user authentication is performed according to an alternate authentication method through a credential provider without inputting the password of the domain account or local account of an in-house Windows.

In addition, another aspect of the present invention provides a method and a system for automatically authenticating a user without the user's direct authentication, and allowing the user to use various business software that requires user authentication with the authentication information used by the credential provider when logging on to a Windows-based system in a business environment that does not use a system integration account or is difficult to change to the system integration account.

Technical Solution

According to an aspect of the present invention, there is provided an authentication management system including a custom credential provider installed on a computing device to support OS account authentication through an alternate authentication method that replaces an OS account authentication method supported by an operating system of the computing device, and an authentication management server communicably connected to the custom credential provider via a communication network to perform user authentication related to a user who attempts to OS account authentication using the alternate authentication information when the OS account authentication based on the alternate authentication information used in the alternate authentication method is attempted and transfer, to the custom credential provider, account authentication information necessary to perform the OS account authentication according to the OS account authentication method supported by the operating system or a seed value that is based on generation of the account authentication information when the user authentication is successful.

According to an embodiment, the authentication management server may newly generate the account authentication information or the seed value every time the OS account authentication is attempted, or newly generate the account authentication information or the seed value only when a pre-specified change time point is reached according to whether a periodic change period of the account authentication information according to a security policy of the operating system has arrived.

According to an embodiment, the custom credential provider may perform authentication according to the OS account authentication method provided by the operating system itself by using received account authentication information when the custom credential provider directly receives the account authentication information from the authentication management server, and provide a user session to a corresponding user who attempts the OS account authentication when the OS account authentication is successful.

According to an embodiment, the custom credential provider may newly generate account authentication information that satisfies a password security rule required by the operating system using a received seed value when the custom credential provider receives the seed value from the authentication management server, update the account authentication information with the newly-generated account authentication information, perform authentication according to the OS account authentication method provided by the operating system itself using the newly-generated account authentication information, and provide a user session to a corresponding user who attempts the OS account authentication when the OS account authentication is successful.

According to an embodiment, the authentication management system may further include a mobile authenticator installed on a mobile device of the user in a form of an app to perform authentication through the alternate authentication method, the custom credential provider may transfer user account information of a user who attempts the OS account authentication to the authentication management sever when the OS account authentication is attempted, and the authentication management server may generate a user authentication value for authenticating a user according to received user account information as the alternate authentication information when the user account information is received, transfer the user authentication value to a corresponding mobile authenticator based on the mobile authenticator information linked to the user account information and perform user authentication according to the alternate authentication information based on a received authentication agreement value when the authentication agreement value is received.

According to an embodiment, when a One Time password (OTP) having a valid time may be used as the user authentication value, the authentication management server may transfer the user authentication value and valid time information for the authentication value to the custom credential provider and the mobile authenticator, and the custom credential provider and the mobile authenticator may respectively allow Graphical User interfaces (GUI) displaying he user authentication value and the valid time together through authentication display windows to be displayed on device screens.

According to an embodiment, the user authentication value may be displayed in a number string or a character string within the authentication display window, and the valid time may be displayed in a form of a time lapse bar within the authentication display window such that lapse of the valid time is visually guided.

According to an embodiment, the authentication management system may further include an authentication client agent installed in the computing device and driven within the user session to execute integrated authentication for business software specified by the user, the custom credential provider may transfer the alternate authentication information to the authentication client agent after the user session is provided, the authentication client agent may request agent authentication from the authentication management server using the received alternate authentication information, and the authentication management server may perform agent authentication using the alternate the authentication information received in response to a request from the agent and transfer a list of business software specified by the user to the authentication client agent when the agent authentication is successful.

According to an embodiment, the authentication client agent may perform business software included in the list when the list of business software is received from the authentication management server and perform processing such that an individual authentication process for each business software is executed.

According to an embodiment, the authentication client agent may transfer the alternate authentication information to the each business software to allow the each business software to perform user authentication in relationship with the authentication management server using the alternate authentication information, and the authentication management server may perform user authentication in response to an authentication request from the each business software using the alternate authentication information, transfer a result of execution of authentication to the each business software to allow individual authentication to be performed in the each business software.

According to an embodiment, the authentication management server may transfer individual authentication information of the each business software included in the list of business software specified by the user to the authentication client agent, and the authentication client agent may execute individual authentication for the each business software using received individual authentication information of the each business software.

Advantageous Effects

According to the embodiment of the present invention, when user authentication is performed according to an alternate authentication method through a credential provider without inputting a password of a domain account or a local account of an in-house Windows, it is possible to automatically set and change (update) the password of the operating system or the like to meet security regulations without directly inputting and changing (updating) the password by the user. In addition, according to the embodiment of the present invention, inconvenience for the user to periodically change the password directly is removed and user's password is exposed to the outside, thereby achieving simple and secure authentication management.

In addition, according to the embodiment of the present invention, it is possible to automatically authenticate the user without the user's direct authentication, and allowing a user to use various business software that requires user authentication with the authentication information used by the credential provider when logging on to a Windows-based system.

DESCRIPTION OF DRAWINGS

FIG. 1 is a diagram illustrating an overall flow of an authentication management method and system for automatically changing an operating system password to satisfy a security rule, according to an embodiment of the present invention.

FIGS. 2 and 3 are diagrams for describing an alternate authentication method according to an embodiment applicable to the present invention.

FIG. 4 is a diagram for describing an integrated logon method and an overall flowchart of a system according to an embodiment of the present invention.

BEST MODE

As the invention allows for various changes and numerous embodiments, particular embodiments will be illustrated in the drawings and described in detail in the detailed description. Accordingly, those of ordinary skill in the art will recognize that modification, equivalent, and/or alternative on the various embodiments described herein can be variously made without departing from the scope and spirit of the disclosure.

Further, in describing the embodiment of the present disclosure, a detailed description of well-known features or functions will be ruled out in order not to unnecessarily obscure the gist of the present disclosure. In addition, numerals (e.g., first, second, etc.) used in the description of the present specification are merely identification symbols for distinguishing one component from another component.

In addition, it will be understood that when an element is referred to as being "coupled" with or "connected" to another element, it may be directly "coupled" with or "connected" to other elements or the other elements or intervening elements may also be present unless specifically stated otherwise.

In addition, throughout the specification, when a part is said to "include" a certain component, it means that it may further include other components, without excluding the other components unless otherwise stated. In addition, the terms "unit", "module", and the like described in the specification mean a unit that processes at least one function or operation, which means that it may be implemented by one or more pieces of hardware or software or a combination of hardware and software.

Hereinafter, embodiments of the present invention will be described in detail with reference to the accompanying drawings. In the present specification, for convenience and concentration of description, a computing device using Microsoft Windows as an operating system (OS) will be described as an example, but the present invention can be applied to a user authentication process in various other operating systems.

In general, a credential provider refers to a user authentication management program or process (hereinafter, referred to as an authentication management module) provided by a corresponding operating system itself. For example, in the case of the Microsoft Windows operating system, the credential provider provided by the Windows operating system itself displays the user account authentication screen (hereinafter abbreviated as the login screen) on a display as shown (A) in FIG. 3 when the user's computer is turned on. Accordingly, the user performs user authentication by inputting user account information and password information of the corresponding OS account on a login screen (see User Name input window and Password input window of (A) FIG. 3). Of course, according to cases, it is obvious that user account information may be set as a default so that a separate user input may not be required. In this case, the password may be requested to be changed after a certain period of time according to a security policy of the corresponding OS elapses, and is also required to be changed according to a password security rule preset in the corresponding OS. For this reason, various problems may occur in password management as discussed above in the description of the background art.

Unlike the above, a custom credential provider refers to a program or a process for supporting user authentication through third alternate authentication means instead of an authentication management module provided by the corresponding operating system In this case, so-called FIDO (Fast Identity Online) technology such as face recognition, fingerprint recognition, and iris recognition may be utilized as the third alternate authentication technology, and various authentication technologies including the methods (B) and (C) of FIGS. 2 and 3 to be described later may be utilized. This custom credential provider may be pre-installed on the user's computer to support the third alternate authentication method. As described above, the present invention is discussed on the premise of a case of performing user authentication related to a corresponding operating system (or a specific user account on the operating system) via a third alternate authentication means.

However, the existing custom credential provider replaces only the OS authentication method with the alternate authentication method, but does not support the periodic change of the OS account password according to the OS security policy and password security rules. Accordingly, an embodiment of the present invention proposes a new method capable of simultaneously supporting the user authentication method through the custom credential provider and periodically change the OS account password. This will be more clearly understood from the description below.

In addition, identification numbers (that is, S111, S112, S113, or the like) relating to each step in the authentication procedure of FIGS. 1, 2, and 4 to be described below are only for distinguishing and describing each step, not defining a procedural order. Of course, each step may be executed in parallel or concurrently, regardless of whether the identification number is subsequent, unless logically one step may be executed after one step has been executed. In some cases, it is obvious that the steps may be executed in a different order than the preceding and subsequent identification numbers. As long as the key technical features of the present invention can be fully reflected, the order of each step may also be variously modified. However, hereinafter, for concentration and convenience of description, each step will be described in the order shown in the drawings.

FIG. 1 is a diagram illustrating an overall flow of an authentication management method and system for automatically changing an operating system password to satisfy a security rule, according to an embodiment of the present invention. Referring to FIG. 1, a system for performing an authentication management method according to an embodiment of the present invention may be implemented by including a custom credential provider 10 and an authentication management server 20. In this case, the custom credential provider 10 and the authentication management server 20 are communicatively connected through a wired communication network or a wireless communication network (or a short-range wireless communication network).

First, when a user turns on a computer, the custom credential provider 10 is executed. Accordingly, the custom credential provider 10 may display a login screen according to a predetermined third alternate authentication method, which is not a login screen of a corresponding operating system itself, on a display screen of the computer.

As described above, the user may input authentication information regarding an OS account of the corresponding user (hereinafter, simply referred to as a user account) through the login screen provided by the custom credential provider 10 (see S112 in FIG. 1). Here, the authentication information means authentication information (that is, alternate authentication information) when using the third alternate authentication method. Accordingly, the custom credential provider 10 may transfer the input authentication information to the authentication management server 20 to request user authentication (see S114 in FIG. 1).

Here, the authentication information may be directly input manually by the user, but may be automatically input. A case in which the authentication information is automatically input will be described as follows. For example, when the FIDO technology is applied as the third alternate authentication method, specific authentication information defined in advance according to the applied FIDO technique may be automatically input. In this case, when the face recognition technology is applied as the alternate authentication method, face recognition information of a corresponding user inputted through a camera installed in the computer may be utilized as the authentication information. As another example, when fingerprint recognition technology or iris recognition technology is applied as an alternate authentication method, fingerprint information or iris information of a corresponding user acquired through a fingerprint reader or an iris reader installed in the computer or communicably connected to the computer in a wired/wireless manner may be used as authentication information.

When the authentication information is transferred as described above, the authentication management server 20 may perform user authentication according to whether the transferred authentication information matches pre-registered authentication information regarding a corresponding user OS account (see S116 in FIG. 1).

Although the custom credential provider 10 is described as receiving authentication information for user authentication and then requesting direct authentication from the authentication management server 20 based on the authentication information in S112 and S114 of FIG. 1 (see (A) of the rectangular dotted box in FIG. 1), an authentication procedure may be performed with a different process from the above-described process. Other embodiments related thereto will be described in detail later with reference to FIG. 2 and (B) and (C) of FIG. 3.

After the user authentication is performed through the alternate authentication information in S116 described above, the authentication management server 20 performs operations for finishing the authentication procedure on the operating system for the corresponding user account. Although the user authentication through the alternate authentication information has been performed through the previous steps, this is only the completion of authentication through the third alternate authentication means, and the actual login (that is, providing a session on the OS account of the user) can only be completed only when the OS password for the user account (that is, OS account authentication information) is internally re-entered to the operating system. The procedure related thereto is shown in S118 to S128 in FIG. 1. This will be described in detail below.

When user authentication is performed through the alternate authentication information in S116 of FIG. 1, the authentication management server 20 generates a password seed value to be used to generate a new OS account password for operating system account authentication (see S118 of FIG. 1) and transfers information on the user account (user name in this example) requesting alternative authentication and the password seed value to the custom credential provider 10 (see S120 of FIG. 1).

Here, generation of the password seed value according to S118 of FIG. 1 may be performed every time OS account authentication is attempted, or only when a pre-specified change time point is reached after checking whether a periodic change (update) period of the OS account password required by the security policy has arrived (for example, when a week of the OS account password change period of the three-month period remains, etc.) However, it may be simpler and safer to change the OS account password every time the OS account authentication is attempted, without determining whether the period is arrived.

The custom credential provider 10 generates a new OS account password through a previously specified algorithm using the received password seed value (see S122 of FIG. 1), performs registration by changing (updating) the OS account password which is previously registered and used to (with) a new OS account password, and then perform authentication for the OS account using the new OS account password and user account information (see S126 in FIG. 1).

To this end, the custom credential provider 10 may be installed with administrator authority to change the password of the OS account in the future when being first installed in the corresponding operating system. Further, according to an embodiment, the custom credential provider 10 generates a PC terminal key by using some or all of the physical unique values (for example, a MAC address, a hard disk unique value, a CPU unique value, etc.) of a corresponding PC, encrypts the PC terminal key and stores it in a storage space of the PC. When a password seed value is transferred from the authentication management server 20 in the future, the custom credential provider 10 may generate a new OS account password by operating the PC terminal key value on the seed value. In addition, since the new OS account password needs to satisfy the password security rule required by the corresponding OS, the custom credential provider 10 may register and use a password generation algorithm satisfying a specified password security rule in advance.

When the authentication according to the above procedure is successful, the custom credential provider 10 provides a user session to the corresponding user.

Although the embodiment of the present invention has been described above with reference to the flowchart of FIG. 1, but it is apparent that modifications may be made to some contents while sharing key technical features of the method defined by the flowchart of FIG. 1.

For example, although the user name is used as account information of the user in the flowchart of FIG. 1, other information may be used. Also, even when using a user name, instead of using a fixed user name, the user name may be changed every time an OS account authentication is attempted. It is possible to increase the security level by continuously changing the user name. In this case, a method of generating, by the authentication management server 20, a change value (update value) of the user name as well as the password seed value, and then transferring it to the custom credential provider 10 may be used.

As another example, although a method of generating, by the authentication management server 20, a password seed value and generating, by the custom credential provider 10, a new OS account password based on the seed value is suggested in the flowchart of FIG. 1, the authentication management server 20 may directly generate a new OS account password and transfer it to the custom credential provider 10. An example thereof is shown in S116 and S125 in FIG. 4.

FIG. 2 and (B), (C) of FIG. 3 are reference diagrams for describing an alternate authentication method of an embodiment applicable to the present invention.

Referring to FIG. 2, it can be seen that a user input of authentication information through a mobile authenticator is performed in an authentication process between the custom credential provider 10 and the authentication management server 20. Here, the mobile authenticator 50 may be a separate mobile device for authentication that performs user authentication, or may be an agent program or a mobile app that performs an authentication function as agent. Hereinafter, the user authentication process according to the flowchart of FIG. 2 will be described in detail. FIG. 2 is a diagram for describing another embodiment capable of replacing the process (A) of the rectangular dotted box of FIG. 1.

As authentication management by the custom credential provider 10 is executed, the custom credential provider 10 transmits account information of a corresponding user requiring user authentication to the authentication management server 20. The authentication management server 20 receiving the user account information inquires an app Push ID linked to account information in a user DB (not shown). In addition, the authentication management server 20 may generate a user authentication value to be used for user authentication of the user account.

In this case, an arbitrary random value, a random number value, an OTP (one time password) or the like may be used as the user authentication value, the generation method thereof is also not particularly limited. In addition, in some cases, the user authentication value may be generated by using specific information corresponding to the corresponding user account information as a seed value for password generation, and additionally, time, number of attempts, or the like may be additionally used as a password generation condition in the process of generating the user authentication value. This may be equally or similarly applied to various authentication values to be described later.

The user authentication value generated as described above is transmitted to the custom credential provider 10. In this case, the authentication management server 20 may also transmit a specific condition for verifying the corresponding user authentication value to the custom credential provider 10. For example, when the OTP is utilized as the user authentication value, the specific condition may be a time limit condition (e.g., 60 seconds) that validly verifies the OPT. The custom credential provider 10 having received the user authentication value and the condition may display a GUI screen for authentication confirmation through a computer screen. An example of such an authentication GUI screen is illustrated through (B) in FIG. 3. Referring to (B) in FIG. 3, it can be seen that the OTP, which is the received user authentication value, is displayed on the screen along with the valid time. In this case, it can be seen that the OTP that is the user authentication value is displayed on the display window 70*b* and the valid time condition is displayed in the form of a time lapse bar. That is, the display window 70*b* visually distinguishes the elapsed valid time or the remaining valid time together with the user authentication value, thereby enabling the user to visually check the valid time of the user authentication value.

In parallel with the above-described process, the authentication management server 20 transfers a push message to the mobile authenticator 50 by using the app push ID which has previously inquired the generated user authentication value. Accordingly, the mobile authenticator may identify the user authentication value received through the screen of the executed authentication app. An exemplary screen thereof is shown through (C) of FIG. 3. Referring to (C) in FIG. 3, it can be seen through the display window of 70*c* that the user authentication value is visually displayed along with the valid time. Accordingly, the user may identify whether the user authentication value displayed on the computer screen matches the user authentication value displayed on the app screen of the mobile authenticator 50. When they match each other, the user may select the accept button of 70*d* to input authentication information, and thus the authentication agreement value may be transmitted to the authentication management server 20. In this case, the authentication agreement value may be the above-described user authentication value itself, or may be a verification value newly generated by the mobile authenticator 50 such that the authentication management server 20 again verifies user authentication through the user authentication value.

When the authentication agreement value is received, the authentication management server 20 completes the user authentication accordingly, and performs subsequent procedures in the relationship with the custom credential provider 10 (for example, steps after S118 of FIG. 1 described above).

FIG. 4 is a diagram showing an overall flow of an integrated login method and system according to an embodiment of the present invention. Here, S112, S114, S116, S125, S126, and S128 of FIG. 4 are not fundamentally different from those of S112 to S128 of FIG. 1 described above, and thus redundant description will be omitted.

When authentication for the OS account of a user is completed according to steps S112 to S128 of FIG. 4, the custom credential provider 10 executes the authentication client 30 in a session provided for the user (S130 in FIG. 4). Here, the authentication client 30 is driven after the user session is opened, and refers to the agent program for executing the integrated authentication-related process of business software.

In this case, the custom credential provider 10 may transfer the alternate authentication information obtained in the previous step S112 to the authentication client 30. Accordingly, the authentication client 30 may request authentication while transferring back the alternate authentication information received from the custom credential provider 10 to the authentication management server 20 (see S132 of FIG. 4). In this case, the authentication request is a process for identifying that the authentication client 30 for executing the integrated authentication of the business software is not a forged agent program (that is, an agent program authorized to execute the integrated authentication).

The authentication management server 20 may authenticate the authentication client 30 by using the alternative authentication information received from the authentication client 30 (see S134 of FIG. 4), and thus identify a user using the corresponding alternate authentication information.

When the authentication according to the above process is successful, the authentication management server 20 may transmit, to the authentication client 30, a list of business software previously registered (i.e., a list of programs to be automatically logged in) so as to allow the user to perform integrated authentication (see S136 in FIG. 4).

The authentication client 30 executes the specified business software according to the received program execution list and transfers the previously received alternate authentication information to each business software (see S138 of FIG. 4). Accordingly, each of the business software executed in this manner (represented by the client program 40 in the flowchart of FIG. 4) transfers the alternative authentication information received from the authentication client 30 to the authentication management server 20 to request authentication (S140 of FIG. 4).

The authentication management server 20 authenticates the user based on the alternate authentication information transmitted from each business software (see S142 in FIG.

4), and transmits an authentication result to each business software upon successful authentication (see S144 in FIG. 4).

In this case, when the each business software receives the authentication result from the authentication management server 20, the each business software may receive individual authentication information (for example, ID/PASSWORD individually set for each business software) to be actually used in the each business software and process authentication, or may receive only an indication of whether the authentication is successful and directly process the authentication using individual authentication information registered.

In order to perform the above-described steps S134 and S142 of FIG. 4, the authentication management server 20 may store the alternate authentication information that is first transferred from the custom credential provider 10 for a time required or set for further authentication of the authentication client 30 and the business software. In addition, when a value used for user authentication (that is, alternate authentication information) is an OTP having a predetermined valid time according to the implementation method, the authentication management server 20 may increase and set the valid time of the OTP not to exceed the time even when the OTP is used in several window client programs 40.

Also, according to the implementation method, it is apparent that, after the user authentication of the operating system, the authentication client 30 may download a list of a separate ID and password for each individual business program from the authentication management server 20 and automatically call the corresponding program.

Also, according to the implementation method, when the client program 40 includes user authentication by a web browser, it is possible to simultaneously call a particular URL including user authentication information along with call of a program, like "iexplorer Http://www.sample.com?id=id&password=1234", for example.

Also, when the client program 40 is a general Windows program by Win32 according to the implementation method, it is also possible to simultaneously start execution by transmitting an ID and a password at the same time when calling a corresponding program like "command id/passowrd"

As described above, it is possible to automatically authenticate and use various business software that requires user authentication by using the alternate authentication information used by the credential provider without the user's direct authentication when the user logs on to a Windows-based system.

The authentication management method according to the embodiment of the present invention described above may be embodied as computer readable codes on a computer readable recording medium. The computer-readable recording media include all kinds of recording media having data stored thereon that can be decrypted by a computer system. For example, there may be a read only memory (ROM), a random access memory (RAM), a magnetic tape, a magnetic disk, a flash memory, an optical data storage device, and the like. The computer readable recording medium can also be distributed over computer systems connected over a computer network, stored and executed as readable code in a distributed fashion.

Although the above has been described with reference to embodiments of the present invention, it is easily understood that those skilled in the art may variously modify and change the present invention without departing from the spirit and scope of the present invention as set forth in the claims below.

The invention claimed is:

1. An authentication management system comprising:
a computing device having a memory configured to store program instructions and one or more processors coupled to the memory, the program instructions comprising:
a custom credential provider configured to support operating system (OS) account authentication through an alternate authentication method that replaces an OS account authentication method supported by an operating system of the computing device; and
an authentication management server communicably connected to the custom credential provider via a communication network to perform user authentication related to a user who attempts the OS account authentication using an alternate authentication information when the OS account authentication based on the alternate authentication information used in the alternate authentication method is attempted and transfer, to the custom credential provider, account authentication information necessary to perform the OS account authentication according to the OS account authentication method supported by the operating system and a seed value to be used to generate a new OS account authentication information when the user authentication is successful,
wherein the custom credential provider newly generates account authentication information that satisfies a password security rule required by the operating system using a received seed value when the custom credential provider receives the seed value from the authentication management server, updates the account authentication information with the newly-generated account authentication information, performs authentication according to the OS account authentication method provided by the operating system itself using the newly-generated account authentication information, and provides a user session to a corresponding user who attempts the OS account authentication when the OS account authentication is successful.

2. The authentication management system of claim 1, wherein the authentication management server newly generates the account authentication information or the seed value every time the OS account authentication is attempted, or newly generates the account authentication information or the seed value only when a pre-specified change time point is reached according to whether a periodic change period of the account authentication information according to a security policy of the operating system has arrived.

3. The authentication management system of claim 1, wherein the custom credential provider performs authentication according to the OS account authentication method provided by the operating system itself by using received account authentication information when the custom credential provider directly receives the account authentication information from the authentication management server, and provides a user session to a corresponding user who attempts the OS account authentication when the OS account authentication is successful.

4. An authentication management system comprising:
a computing device having a memory configured to store program instructions and one or more processors coupled to the memory, the program instructions comprising:

a custom credential provider configured to support operating system (OS) account authentication through an alternate authentication method that replaces an OS account authentication method supported by an operating system of the computing device; and an authentication management server communicably connected to the custom credential provider via a communication network to perform user authentication related to a user who attempts the OS account authentication using an alternate authentication information when the OS account authentication based on the alternate authentication information used in the alternate authentication method is attempted and transfer, to the custom credential provider, account authentication information necessary to perform the OS account authentication according to the OS account authentication method supported by the operating system and a seed value to be used to generate a new OS account authentication information when the user authentication is successful, wherein the custom credential provider newly generates account authentication information that satisfies a password security rule required by the operating system using a received seed value when the custom credential provider receives the seed value from the authentication management server; and a mobile device having a memory configured to store a mobile authenticator program and one or more processors coupled to the memory, the mobile authenticator program configured to perform authentication through the alternate authentication method, wherein the custom credential provider transfers user account information of a user who attempts the OS account authentication to the authentication management sever when the OS account authentication is attempted, wherein the authentication management server generates a user authentication value for authenticating a user according to received user account information as the alternate authentication information when the user account information is received, transfers the user authentication value to a corresponding mobile authenticator based on a mobile authenticator information linked to the user account information, and performs user authentication according to the alternate authentication information based on a received authentication agreement value when the authentication agreement value is received.

5. The authentication management system of claim 4, wherein, when a One Time password (OTP) having a valid time information is used as the user authentication value, wherein the authentication management server transfers the user authentication value and the valid time information for the user authentication value to the custom credential provider and the mobile authenticator program, wherein the custom credential provider and the mobile authenticator program respectively allow Graphical User interfaces (GUI) displaying the user authentication value and the valid time information together through authentication display windows to be displayed on device screens.

6. The authentication management system of claim 5, wherein the user authentication value is displayed in a number string or a character string within the authentication display window, and the valid time information is displayed in a form of a time lapse bar within the authentication display window such that lapse of the valid time information is visually guided.

7. The authentication management system of claim 4, further comprising: an authentication client agent installed in the computing device and driven within a user session to execute integrated authentication for business software specified by the user, wherein the custom credential provider transfers the alternate authentication information to the authentication client agent after the user session is provided, wherein the authentication client agent requests agent authentication from the authentication management server using the alternate authentication information, and wherein the authentication management server performs the agent authentication using the alternate authentication information received in response to a request from the agent and transfers a list of business software specified by the user to the authentication client agent when the agent authentication is successful.

8. The authentication management system of claim 7, wherein the authentication client agent performs business software included in the list when the list of business software is received from the authentication management server and performs processing such that an individual authentication process for each business software is executed.

9. The authentication management system of claim 8, wherein the authentication client agent transfers the alternate authentication information to the each business software to allow the each business software to perform user authentication in relationship with the authentication management server using the alternate authentication information, wherein the authentication management server performs user authentication in response to an authentication request from the each business software using the alternate authentication information, transfers a result of execution of authentication to the each business software to allow individual authentication to be performed in the each business software.

10. The authentication management system of claim 8, wherein the authentication management server transfers individual authentication information of the each business software included in the list of business software specified by the user to the authentication client agent, and wherein the authentication client agent executes individual authentication for the each business software using received individual authentication information of the each business software.

* * * * *